(12) United States Patent
Belt et al.

(10) Patent No.: US 6,706,090 B2
(45) Date of Patent: Mar. 16, 2004

(54) METHOD FOR RECOVERING AND/OR SEPARATING SULFUR OXYFLUORIDES FROM GAS MIXTURES

(75) Inventors: Heinz-Joachim Belt, Burgwedel (DE); Michael Pittroff, Hannover (DE); Matthias Rieland, Hannover (DE); Thomas Schwarze, Ahlten (DE)

(73) Assignee: Solvay Fluor und Derivate GmbH, Hanover (DE)

( * ) Notice: Subject to any disclaimer, the term of this patent is extended or adjusted under 35 U.S.C. 154(b) by 0 days.

(21) Appl. No.: 10/213,429

(22) Filed: Aug. 7, 2002

(65) Prior Publication Data

US 2003/0047069 A1 Mar. 13, 2003

Related U.S. Application Data

(63) Continuation of application No. PCT/EP01/01136, filed on Feb. 2, 2001.

(30) Foreign Application Priority Data

Feb. 8, 2000 (DE) .......................... 100 05 456

(51) Int. Cl.[7] .................. B01D 53/22; B01D 53/047
(52) U.S. Cl. .................. 95/48; 95/49; 95/96; 95/106; 95/131; 95/135
(58) Field of Search ................ 95/48, 49, 96, 95/99, 106, 131, 135, 902

(56) References Cited

U.S. PATENT DOCUMENTS

| 3,078,640 | A | * | 2/1963 | Milton ..................... 95/136 |
| 4,461,631 | A | * | 7/1984 | Itabashi et al. ............ 95/127 |
| 4,466,812 | A | * | 8/1984 | Takaishi et al. ........... 95/116 |
| 4,748,013 | A | * | 5/1988 | Saito et al. ............... 423/241 |
| 5,332,424 | A | * | 7/1994 | Rao et al. .................. 95/47 |
| 5,417,950 | A | * | 5/1995 | Sheu et al. ............. 423/239.2 |
| 5,505,908 | A | * | 4/1996 | Nagji ....................... 422/31 |
| 5,753,011 | A | * | 5/1998 | Sircar et al. ................. 95/45 |
| 5,759,237 | A | * | 6/1998 | Li et al. .................... 95/41 |
| 5,928,411 | A | * | 7/1999 | Falb et al. ................. 95/129 |
| 5,976,222 | A | * | 11/1999 | Yang et al. ................. 95/45 |
| 6,007,706 | A | * | 12/1999 | Carnell et al. ............. 208/303 |
| 6,074,459 | A | * | 6/2000 | Gingrich et al. ........... 95/118 |
| 6,099,619 | A | * | 8/2000 | Lansbarkis et al. ......... 95/118 |
| 6,454,837 | B1 | * | 9/2002 | Pittroff et al. ............. 95/47 |

* cited by examiner

*Primary Examiner*—Robert H. Spitzer
(74) *Attorney, Agent, or Firm*—Crowell & Moring LLP

(57) ABSTRACT

A method for the recovery or separation of sulfur oxyfluorides from gas mixtures, in which the gas mixture passes through at least one adsorption stage or membrane stage containing or consisting of zeolites with a modulus >10. The sulfur oxyfluorides fixed to the adsorbent may be made available for use after desorption. The sulfur oxyfluorides enriched through the membrane can be re-used directly.

16 Claims, 1 Drawing Sheet

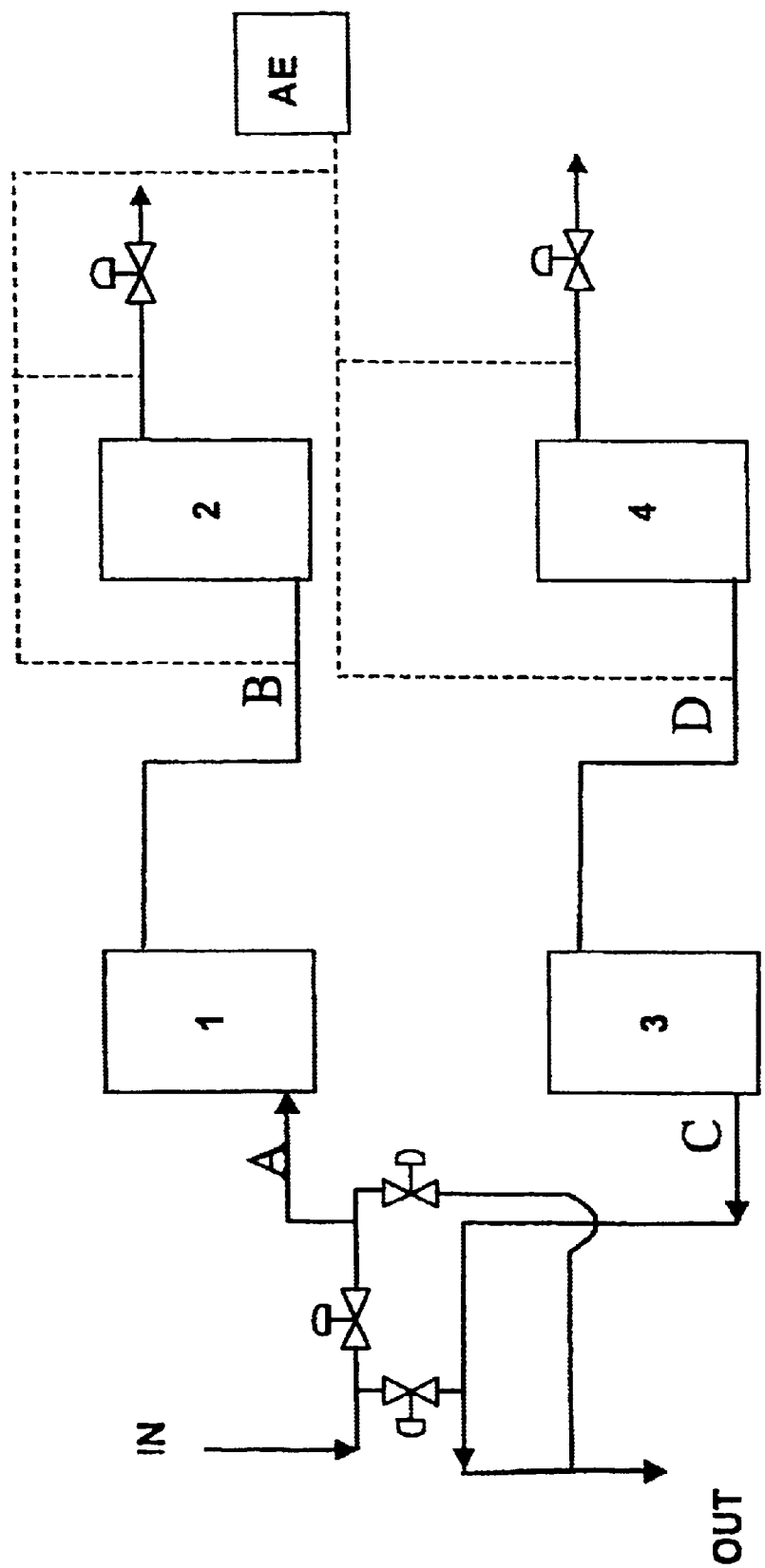

METHOD FOR RECOVERING AND/OR SEPARATING SULFUR OXYFLUORIDES FROM GAS MIXTURES

CROSS REFERENCE TO RELATED APPLICATIONS

This application is a continuation of international patent application no. PCT/EP01/01136, filed Feb. 2, 2001, designating the United States of America, the entire disclosure of which is incorporated herein by reference. Priority is claimed based on Federal Republic of Germany patent application no. DE 100 05 456.0, filed Feb. 8, 2000.

BACKGROUND OF THE INVENTION

The invention relates to a method for the recovery or separation of sulfur oxyfluorides from gas mixtures, in particular for the recovery of sulfuryl fluoride ($SO_2F_2$) or thionyl fluoride ($SOF_2$) from air or exhaust air which is contaminated therewith.

Federal Republic of Germany patent application no. DE 197 08 669 describes a method for the fumigation of spaces by introducing a fumigation agent and continuously withdrawing the treatment atmosphere, wherein the fumigation agent can be separated e.g. in an adsorber and can be re-used after desorption. Coal particles or aluminium oxide particles are mentioned as adsorption agents, and inter alia sulfuryl fluoride as fumigation agent. Sulfuryl fluoride can be and is used as a pesticide. For example pests in fresh wood or wood used in buildings (woodworm, fungi), in storage spaces or in mills (granary weevils) or textiles can be controlled using $SO_2F_2$. In this case, $SO_2F_2$ is used on its own or in combination with other known pesticides. Once fumigation has ended, usually the $SO_2F_2$ is decomposed by heat or destroyed by lye. The secondary products produced thereby can frequently be disposed of only on special waste dumps.

There is a need to be able to work up gas mixtures of this type with the aim of being able to re-use the sulfur oxyfluorides.

SUMMARY OF THE INVENTION

An object of the present invention is to provide an improved method for the separation of sulfur oxyfluorides from gas mixtures.

Another object of the invention is to provide a method for separating sulfur oxyfluorides from gas mixtures in which virtually no environmentally damaging constituents of the gas mixtures pass into the atmosphere and the components which are separated out can be re-used.

A further object of the invention is to provide a method for separating sulfur oxyfluorides from gas mixtures in which no secondary products requiring disposal are produced.

These and other objects are achieved in accordance with the present invention by providing a method for the recovery or separation of sulfur oxyfluorides from a gas mixture comprising passing the gas mixture over at least one adsorption or membrane stage containing or consisting of a zeolite having a modulus >10 and a pore diameter of 0.4 to 0.7 nm, and thereafter recovering separated sulfur oxyfluorides.

According to the invention, gas mixtures containing one or more sulfur oxyfluorides are contacted with adsorbents and/or membranes for recovery of the sulfur oxyfluorides and the sulfur oxyfluorides which are separated out are sent for re-use, optionally after desorption, depending on requirements. The air which is low in or freed of sulfur oxyfluoride from the gas mixture can be let off into the atmosphere without hesitation.

In particular, the term sulfur oxyfluorides within the scope of the invention is to be understood as including compounds of sulfur, oxygen and fluorine such as $SO_2F_2$, $SOF_4$, and $SOF_2$. Gas mixtures having a sulfur oxyfluoride content from 5 ppmv or 20 mg/m$^3$ or more may be separated.

According to the invention, the gas mixture is passed through at least one adsorption stage and/or membrane stage containing or consisting of zeolites, which have an $SiO_2/Al_2O_3$ ratio, the so-called modulus, >10 preferably >100, a particle size >1 mm, preferably >2 mm, and a pore diameter of 0.4 to 0.7 nm, preferably 0.5 to 0.65 nm, the particle size applying for the zeolite which is used as adsorbent.

Zeolites which have been subjected to dealumination in order to replace the $Al_2O_3$ in the lattice by $SiO_2$, which thereby increases the modulus, are highly suitable. At the same time, this makes the polar forces weaker and thus the hydrophobicity of the zeolite is increased (W. Otten et al., Chem.-Ing. Tech. 64 (1992) No. 10, pp. 915–925)

It is within the scope of the invention to use the zeolites both as a loose bed in adsorber columns or as a membrane. Use of a combination of an adsorption stage and a membrane stage likewise is within the scope of the invention.

The adsorption is effected at a pressure of at most 15 atm. at 21° C.

In one embodiment of the method according to the invention, pest control with $SO_2F_2$ is performed in closed containers or spaces. The $SO_2F_2$-containing atmosphere present as a gas mixture (0.05 to 10% by volume $SO_2F_2$) in the containers or spaces is removed therefrom once fumigation has ended and is contacted with the adsorbents and/or the membranes to recover the $SO_2F_2$. The air which is depleted in $SO_2F_2$ from the gas mixture can then be discharged into the atmosphere.

In another embodiment, the gas mixture is passed over two or more adsorption stages and/or membrane stages.

The adsorbed sulfur oxyfluoride can be desorbed from the sorbent by increasing the temperature and/or reducing the pressure and be sent for re-use.

The regeneration of the adsorbents (desorption) takes place in known manner by supplying heat and/or lowering the pressure.

The desorption takes place in a temperature range from 20 to 300° C., preferably at a temperature >100° C. It has proved advantageous to allow the desorption to take place at reduced pressure. In one embodiment, the adsorber column after heating is exposed to a technical vacuum of up to $10^{-3}$ bar for desorption.

If the gas mixture additionally contains impurities, purification by e.g. filtration or adsorption with other adsorbents may take place before the adsorption. It is likewise within the scope of the invention, first to free the gas mixture of water, e.g. by drying with suitable drying agents, and then to pass it through the adsorbers or membrane.

The apparatus for carrying out the method according to the invention comprises at least one adsorber with a bed of zeolites having a modulus >10, preferably >100, a particle size >1 mm, preferably >2 mm, and a pore diameter of 0.4 to 0.7 nm, preferably 0.5 to 0.65 nm, and/or at least one membrane, consisting of or containing a zeolite having a modulus of 10, preferably 100 and a pore diameter of 0.4 to 0.7 nm, preferably 0.5 to 0.65 nm. A compressor is located before the adsorber or the membrane. The apparatus comprises at least one supply line for the gas mixture, a line for removing the gas into the atmosphere and also measuring, regulating and monitoring devices.

In a preferred embodiment, it has proved advantageous to use at least two adsorber stages, which may each also comprise a plurality of adsorber columns, since they permit continuous operation if connected in parallel. The alternate operation of adsorption and desorption is ensured by suitable regulating and control devices.

In one embodiment of the invention, the gas mixture to be separated is introduced into the adsorber stage by a pump or a compressor via a supply line.

The number and capacity of the adsorbers depends on whether a gas with a high or low sulfur oxyfluoride content is to be treated. The capacity of the adsorbers can be increased, for example, by increasing the adsorber volume of the individual adsorber columns or by increasing the number of adsorber columns.

Before the depleted gas is discharged into the atmosphere, the composition of the gas is analyzed and monitored by a monitoring device, which may preferably comprise an infrared (IR) spectrometer.

BRIEF DESCRIPTION OF THE DRAWING

The invention will be described in further detail hereinafter with reference to an illustrative preferred embodiment shown in the accompanying drawing FIGURE, which is a schematic representation of an installation for carrying out the method of the invention.

DETAILED DESCRIPTION OF PREFERRED EMBODIMENTS

The accompanying drawing FIGURE shows a schematic representation of a plant with parallel adsorber stages each comprising two adsorber columns connected in series. This plant is very compact and is suitable for construction, for example, on the bed of a heavy truck. For simplicity, the compressors before each adsorber column have been omitted. Likewise, the heaters, vacuum pumps, measuring and regulating devices etc. are not shown.

The adsorber columns are filled with a loose bed of the zeolites described above.

The plant is laid out such that for continuous operation one adsorber line adsorbs while the other adsorber line is undergoing regeneration.

The gas mixture at a pressure of at most 20 bar (abs.) is introduced via line A into the adsorber 1. The gas mixture leaving the adsorber 1 is passed into the adsorber 2 via line B. Before the gas mixture leaving the adsorber 2, which contains no or only insignificant amounts of sulfur oxyfluoride, is discharged into the atmosphere, the composition of the gas mixture is analyzed and monitored in the monitoring device AE (preferably an IR-analysis apparatus).

Simultaneously the adsorbers 3 and 4, which are connected to each other via line D, are regenerated, i.e. the adsorbed gas mixture is desorbed.

The desorption takes place by pressure, and change in temperature, in that the adsorber columns are heated and/or the pressure in the adsorber columns is changed with the aid of vacuum pumps.

The desorbed gas mixture which is greatly enriched with sulfur oxyfluoride is collected in a storage container via line C and is thus available for further use.

In another embodiment of the method the gas to be separated passes through a combination of a membrane separation stage and an adsorption separation stage. The pressure on the inlet side of the membrane is usually higher than the ambient pressure. A pump or a compressor is located before the membrane. The gas mixture to be separated is fed at a pressure of up to 20 bar. The retentate leaving the membrane stage, with an increased content of sulfur oxyfluoride, passes into a collecting container and can be re-used immediately e.g. after liquefaction with a compressor.

The permeate is passed into at least one adsorber for further separation. optionally the permeate may be compressed before entry into the adsorber.

It is likewise conceivable that the retentate of the first membrane stage is introduced into a second membrane stage. The permeate resulting from this second membrane stage can be recycled into the first membrane stage or be passed into the subsequent adsorber stages.

The membrane may be present in conventional form. The membrane material contains or consists of a zeolite having a modulus >10, preferably >100, and a pore diameter of 0.4 to 0.7 nm, preferably 0.5 to 0.65 nm.

The apparatus can also be constructed in mobile form, for example on the chassis of a motor vehicle, so that the method according to the invention can be carried out in situ.

The following examples are intended to illustrate the invention, without limiting its scope.

For the following examples, the following zeolites were used as adsorbents:

| No. | Trade Mark | Type | Modulus | Particle size | Pore diameter nm |
|---|---|---|---|---|---|
| 1 | Zeocat PZ-2/400 | ZSM5 Na form | 400 | 2.5 mm | 0.53 × 0.56; 0.51 × 0.55 |
| 2 | Wessalith DAZ F 20 | Pentasil MF | >1,000 | 2 mm | 0.6 |
| 3 | Sicolith 400 | 4A granules | 2 | 1–2 mm | 0.4 |
| 4 | Grace 522 | A | 2.6 | 1.6–2.5 mm | 0.5 |

EXAMPLE 1

An $SO_2F_2/N_2$ mixture containing 2.47% by volume $SO_2F_2$ was passed over an adsorber which contained a bed of 320 g adsorbent. Zeocat PZ-2/400 (manufacturer: Chemie Uetikon GmbH, Uetikon (Switzerland)) was used as adsorbent.

The gas mixture was passed over the adsorbent for 54 minutes at a throughflow rate of 3.13 liters/minute until a maximum emission concentration of $SO_2F_2$ of 20 ppmv was attained. The adsorption capacity was determined by differential weighing.

Result: 23.28 g gas was adsorbed, of which 18.78 g was $SO_2F_2$.

EXAMPLE 2

An $SO_2F_2/N_2$ mixture containing 2.47% by volume $SO_2F_2$ was passed over an adsorber which contained a bed of 360 g adsorbent. Wessalith DAZ F20 (manufacturer: Degussa AG) was used as adsorbent.

The gas mixture was passed over the adsorbent for 44 minutes at a throughflow rate of 3.63 liters/minute until a maximum emission concentration of $SO_2F_2$ of 147 ppm was attained after 51 minutes. The adsorber capacity was determined by differential weighing.

Result: 23.4 g gas was adsorbed, of which 17.73 g was $SO_2F_2$.

EXAMPLE 3

Comparison Example

The test was performed analogously to Example 1 except that Sicolith 400 (manufacturer: Solvay) was used as the adsorbent.

Result: no measurable quantity of gas was adsorbed.

EXAMPLE 4

Comparison Example

The test was performed analogously to Example 2 except that Grace 522 (manufacturer: W. R. Grace, Nd. Worms) was used as the adsorbent.

Result: no measurable quantity of gas was adsorbed.

The results show that with zeolites which do not meet the selection criterion according to the invention in terms of modulus, particle size and pore diameter, no adsorption of e.g. $SO_2F_2$ is possible.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A method for the recovery or separation of sulfur oxyfluorides from a gas mixture, said method comprising:

passing the gas mixture over at least one adsorption or membrane stage containing or consisting of a zeolite having a modulus >10 and a pore diameter of 0.4 to 0.7 nm, and thereafter recovering separated sulfur oxyfluorides.

2. A method according to claim 1, wherein the sulfur oxyfluorides are adsorbed on the zeolites and are recovered by desorption.

3. A method according to claim 1, wherein the sulfur oxyfluorides are accumulated at a membrane surface and are recovered directly from the surface of the membrane.

4. A method according to claim 1, wherein said zeolite has a particle size >1 mm and said zeolite is used as adsorbent.

5. A method according to claim 1, wherein said zeolite has a modulus >100, a particle size >2 mm and a pore diameter of 0.5 to 0.65 nm and said zeolite is used as adsorbent.

6. A method according to claim 1, wherein a membrane comprising said zeolite is used for the separation and wherein said zeolite has a modulus >100 and a pore diameter of 0.5 to 0.65 nm.

7. A method according to claim 6, wherein the membrane consists of said zeolite.

8. A method according to claim 1, wherein adsorption of sulfur oxyfluoride is effected at a pressure of at most 20 atm (at 21° C.).

9. A method according to claim 1, wherein the gas mixture is a sulfur oxyfluoride/air mixture having a sulfur oxyfluoride content of at least 5 ppmv or 20 mg/m$^3$.

10. A method according to claim 1, wherein the gas mixture is contacted with at least two adsorption or membrane stages.

11. A method according to claim 1, wherein the sulfur oxyfluorides are desorbed from the zeolite by increasing the temperature or reducing the pressure.

12. A method according to claim 11, wherein the desorption is effected at a temperature ranging from 20° C. to 300° C.

13. A method according to claim 12, wherein the desorption is effected at a temperature >100° C.

14. A method according to claim 11, wherein the desorption is effected at a reduced pressure ranging down to 10$^{-3}$ bar.

15. A method according to claim 1, wherein the sulfur oxyfluorides are desorbed from the zeolite by increasing the temperature and reducing the pressure.

16. A method according to claim 1, wherein said adsorption or membrane stage is constructed as part of a mobile apparatus.

* * * * *